United States Patent [19]

Kreda

[11] 3,708,678

[45] Jan. 2, 1973

[54] VARIABLE THRESHOLD CIRCUIT

[75] Inventor: Eugene J. Kreda, Natick, Mass.

[73] Assignee: Servo Corporation of America, Hicksville, N.Y.

[22] Filed: Oct. 30, 1970

[21] Appl. No.: 85,624

[52] U.S. Cl. ..............250/219 D, 330/24, 250/214 R

[51] Int. Cl. ..............................................G08c 9/06

[58] Field of Search.250/219 D, 219 DC, 206, 214R; 235/61.11 E; 330/30 D, 69, 24

[56] References Cited

UNITED STATES PATENTS

| | | | |
|---|---|---|---|
| 3,586,864 | 6/1971 | Brany | 250/219 DC |
| 3,560,751 | 2/1971 | Buettner | 250/214 R |
| 3,320,430 | 5/1967 | Gorman | 250/219 D |
| 3,321,637 | 5/1967 | Beltz et al. | 250/219 DC |

*Primary Examiner*—Walter Stolwein
*Attorney*—David S. Kane et al.

[57] ABSTRACT

A threshold circuit employs a high gain differential amplifier having a signal source connected to the inverting input connection thereof. Connected between the signal source and the noninverting connection of the differential amplifier is a pair of diodes connected in an opposite polarity arrangement and in parallel. Also connected to the noninverting input connection is a capacitor to hold the signal level at the noninverting input connection constant for a predetermined interval during a polarity reversal of the signal from the signal source. The circuit threshold is maintained at one diode voltage drop relative to the signal from the signal source.

8 Claims, 3 Drawing Figures

INVENTOR
Eugene J. Kreda
By Robert T. Orner
Attorney

INVENTOR

Eugene J. Kreda

By Robert T. Orner

Attorney

VARIABLE THRESHOLD CIRCUIT

BACKGROUND OF THE INVENTION

This invention relates to threshold circuits and in particular to threshold circuits in which the background noise and signal vary over a wide range of values.

In optical systems employing light signals reflected from a coded label, a detector and threshold circuit having a wide dynamic range are required. Large variations in both the ambient light and the light reflection characteristics of the coded label result in interlabel and intralabel light variations of considerable magnitude. These light variations impose dynamic threshold requirements on the optical receiver and make static threshold circuits ineffective in this optical environment. It would, therefore, be advantageous to have, and it is one of the objects of this invention to provide, a threshold circuit capable of sensing the input signal and maintaining the threshold at a predetermined level with respect to the input signal.

SUMMARY OF THE INVENTION

A threshold circuit according to the present invention includes a comparator means, for example, a high gain differential amplifier having a first input connection coupled to an input port, a second input connection, and an output connection, and being operative to generate at its output connection a first output signal when a signal at the first input connection is greater than a signal at the second input connection and a second output signal when the signal at said second input connection is greater than the signal at the first input connection. Coupled between the input port and the second input connection of the comparator means is a first means for maintaining the second input connection of the comparator means at a first predetermined level below the level at the first input connection during a first signal condition at the input port.

Also included in the threshold circuit is a second means, coupled between the input port and the second input connection of the comparator means, for maintaining the second input connection at a second predetermined level above the level at said first input connection during a second signal condition at the input port.

In operation, when an input signal at the input port is in the first condition which, for example, is the condition of noise or the signal going in a positive direction, the second input connection of the comparator means is maintained at the first predetermined level below the level at the first input connection and the comparator means generates the first output signal, for example, a negative signal. When the second signal condition occurs (for example, the signal level at the input port goes in a negative direction) and the first predetermined level is exceeded, the comparator output changes to its second output signal, and the second predetermined level is established between the first and the second input connections of the comparator means.

BRIEF DESCRIPTION OF THE DRAWINGS

The construction and operation of the threshold circuit will be more fully understood from the following detailed description taken in conjunction with the accompanying drawings in which.

DETAILED DESCRIPTION OF THE INVENTION

Figure 1:
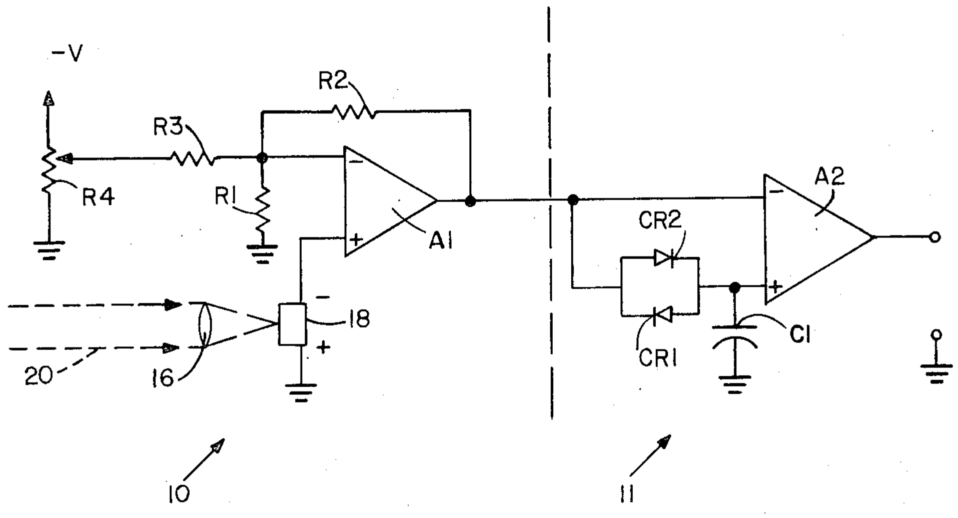
FIG. 1 is a schematic diagram of an embodiment of a threshold circuit according to the invention.

A schematic diagram of a dynamic threshold circuit according to the invention is shown in FIG. 1 and includes a source of input signals 10 (to be explained in detail hereinafter) coupled to a first input connection (for example, the inverting input connection) of a differential comparator circuit A2 such as a Fairchild $\mu$747C Operational Amplifier. Coupled between the source of input signals 10 and a second input connection, for example, the noninverting input connection of the comparator circuit A2, are first and second rectifying devices such as a pair of oppositely poled parallel connected diodes CR1 and CR2. Coupled between the second input connection of the comparator circuit A2 and a source of reference potential, for example, ground, is a storage means such as the capacitor C1.

The source of input signals 10, for example, may include a lens 16 coupled to a photodetector 18 which in turn is coupled between ground and one input connection of a second operational amplifier A1. Connected to a second input connection of the operational amplifier A1 are first resistor R1 (the other end of which is connected to ground), second resistor R2 (the other end of which is connected to the output connection of the operational amplifier A1) and third resistor R3 (the other end of which is connected to the center tap of a potentiometer R4). The other ends of the potentiometer R4 are connected between a source of voltage (not shown) and ground, respectively.

The operation of the source of signals 10 and the threshold circuit 11 of FIG. 1 will be explained in conjunction with the waveforms of FIGS. 2 and 3. Shown in FIG. 2 (a) is a portion of a label 40 including a plurality of retroreflective stripes 42 arranged, for example, in a binary coded decimal format. Light rays 20 (FIG. 1) reflected from the stripes 42 are focused by the lens 16 onto the photodetector 18 where the optical signals are converted to electrical signals. After amplification by the operational amplifier A1, the resulting electrical signals (waveform (b) of FIG. 2) are directed to the threshold circuitry 11.

Figure 2:
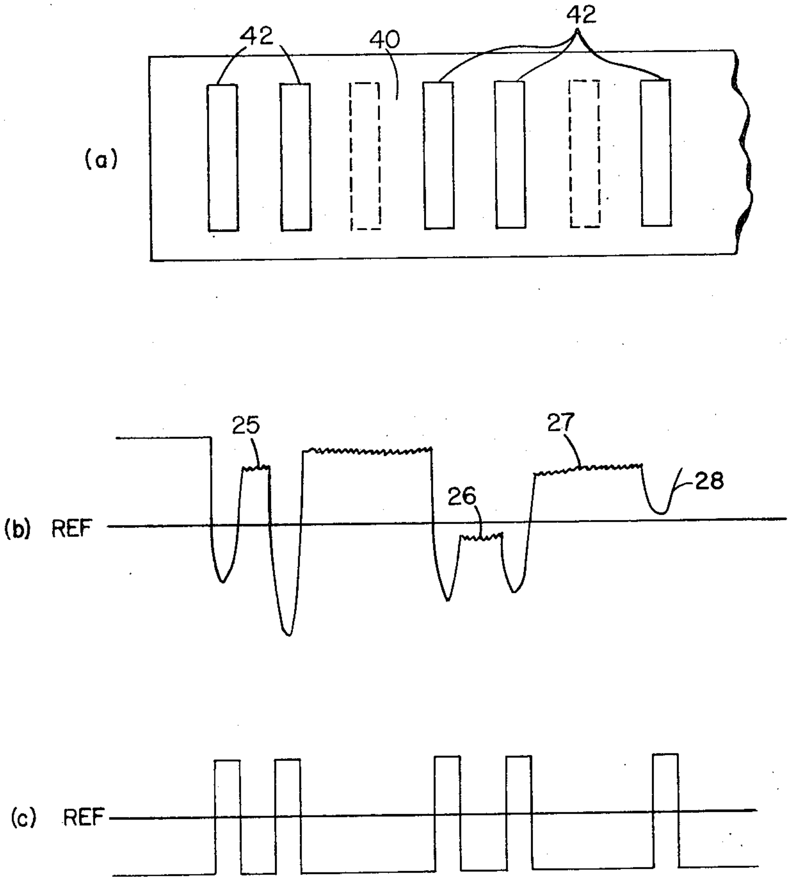
FIG. 2 is a diagram of a label and signals resulting therefrom useful in explaining the operation of the threshold device of FIG. 1.

Note in waveform (b) of FIG. 2 the background or noise portions 25, 26 and 27 of the signal are not the same amplitude and, therefore, a fixed threshold system would not be effective for signals having large variations therein. For example, the signal 28 from the fifth stripe would be lost if a fixed threshold were set at the amplitude of the noise portion 26. Waveform (c) of FIG. 2 depicts the resultant signal at the output connection of the comparator A2.

Figure 3:
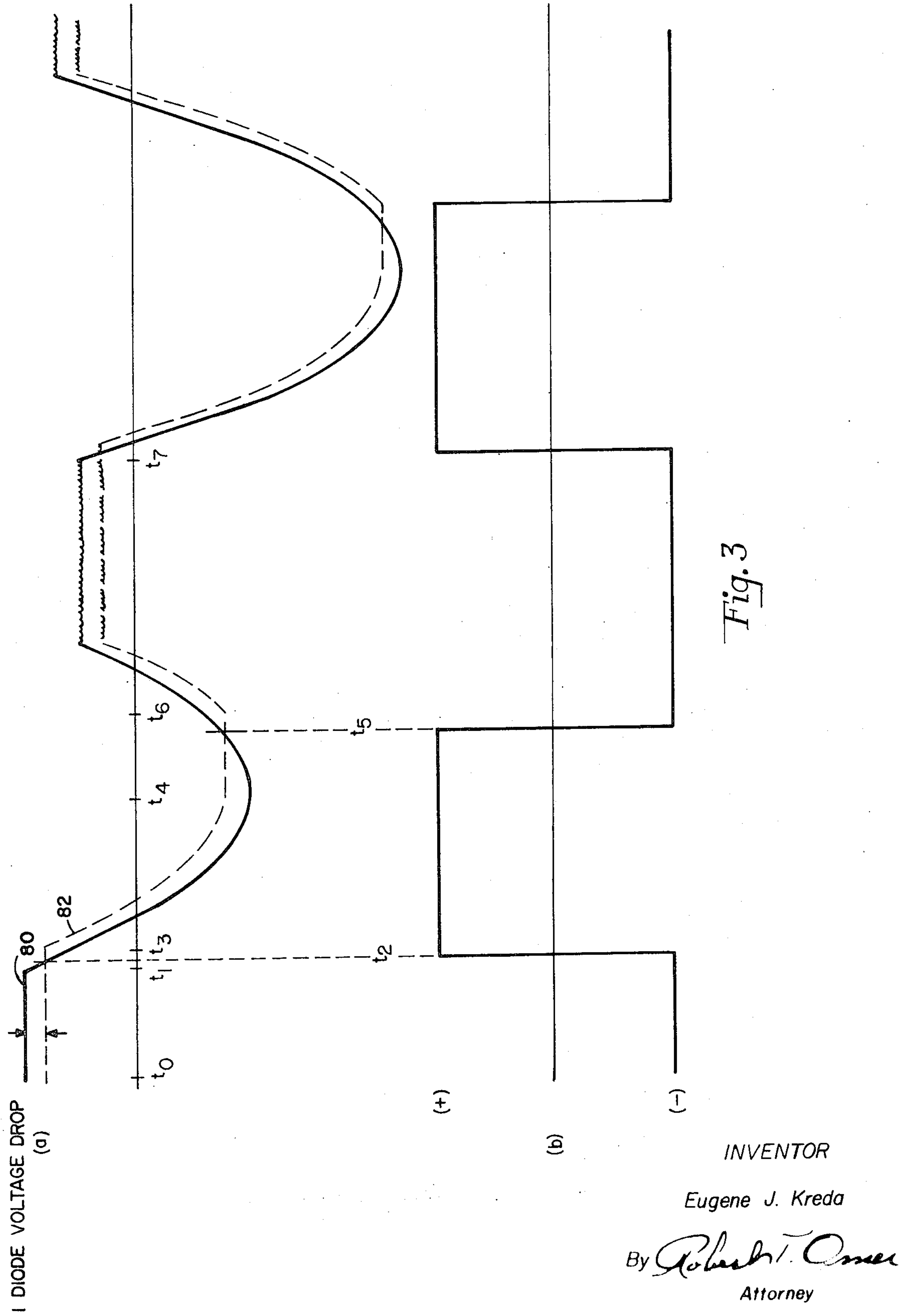
FIG. 3 includes expanded segments of the waveforms of FIG. 2.

To better understand the operation of the threshold circuit 11, waveform (a) of FIG. 3 includes an expanded version 80 of a portion of the waveform (b) of FIG. 2. The signal 80 appears at the first input connection of the comparator A2. Also included in waveform (a) of FIG. 3 is the waveshape 82 of the signal appearing at the second input connection of the comparator circuit A2. The output signal 80 generated by the signal source 10 is directed to the first input connection (inverting connection) of the comparator circuit A2 and to the diodes CR1 and CR2. From the time $t_0$ to $t_1$, diode CR2 conducts, and the signal at the second input connection of the comparator is one diode voltage drop (the first threshold level) less than the signal at the first input connection. Therefore, the positive signal at the first or inverting connection is greater than the positive signal at the second or noninverting connection, and the comparator output signal (waveform (b) of FIG. 3) is saturated in the negative direction.

At time $t_1$, the input signal 80 at the first input connection of the comparator starts in a negative direction reverse biasing the diode CR2. The capacitor C1 maintains the voltage level at the second input connection substantially constant. At time $t_2$, the signal 80 at the first input connection of the comparator is more negative than the signal 82 at the second input connection causing the comparator output signal (waveform (b) of FIG. 3) to become saturated in the positive direction. The capacitor C1 continues to maintain the voltage level at the second input connection substantially constant until the second threshold level is reached at time $t_3$. The second threshold level is a function of the diode voltage drop across the diode CR1. As the input signal 80 becomes more negative, the diode CR1 becomes forward biased thereby charging the capacitor to a voltage one diode drop positive from the signal voltage 80.

When the signal 80 at the first input connection of the comparator circuit A2 reaches its peak negative excursion (at time $t_4$) and goes in a positive direction, the diode CR1 becomes reverse biased, and the second input connection is one diode voltage drop positive with respect to the signal 80. The signal 80 at the first input connection is thus more positive than the signal 82 at the second input connection causing the comparator output signal (waveform (b) of FIG. 3) to saturate in the negative direction. The voltage level at the second input connection remains substantially constant because of the capacitor C1 until the signal 80 exceeds the signal 82 by the first threshold level (one diode voltage drop) at time $t_5$. At time $t_6$, the signal 80 at the first input connection of the comparator circuit A2 is more positive than the signal level 82 at the second input connection by a voltage equal to the diode voltage drop across diode CR2 causing the diode CR2 to be forward biased and the capacitor to be recharged in the opposite direction. The signal level 82 at the second input connection then remains at a predetermined level (one diode drop) below the level at the first input connection until time $t_7$.

In effect there are two different threshold levels for two segments of the input signal, one set by the voltage drop across the diode CR2 (from time $t_0$ to $t_1$ and from time $t_6$ to $t_7$) and the other set by the voltage drop across the diode CR1 (from time $t_3$ to $t_4$). When the input signal at the first input connection of the comparator circuit exceeds the first threshold level (at time $t_2$, for example), the comparator circuit A2 changes the polarity of its output signal. At time $t_3$, a new threshold value is set by the voltage drop across the diode CR1. When the input signal starts in a positive direction and exceeds the second threshold level (at time $t_5$, for example), the comparator output signal is again changed. In the present invention, the threshold levels track or float with the input signal and are reset with a change in direction of the input signal.

Either one or both threshold levels can be changed independently. By placing a third diode in series and in the same direction with the diode CR1, a signal at the first input connection of the comparator will only be sensed at the output when it exceeds the signal at the second input connection by a level equal to two diode voltage drops.

In the signal source 10, the operational amplifier A1 and the associated resistors provide gain for the photosensitive detector 18. Light rays 20 received from a label are focused onto the photosensitive detector 18 (well known in the art) where the light is converted into an electrical signal and amplified by the operational amplifier A1. The gain G of the operational amplifier for the resistor R1 <<R3 is given in Equation (1)

$$G = (R1 + R2\,R1) + V \qquad (1)$$

where V is the signal voltage from the photodetector 18. Typical values of the resistors are R1=1.OK ohms, R2 =390.OK ohms, R3 =390.OK ohms, R4 =10.OK ohms.

While there has been shown and described what is considered a preferred embodiment of the present invention, various modifications and changes may be made therein without departing from the invention as defined in the appended claims.

What is claimed is:

1. A threshold circuit comprising:

an input port;

signal means connected to said input port;

comparator means having a first input connection coupled to said input port, a second input connection and an output connection and being operative to generate at its output connection a first signal when a signal at said first input connection is greater than a signal at said second input connection and to generate at its output connection a second signal when the signal at said first input connection is less than the signal at said second input connection;

first means, coupled between said input port and said second input connection of said comparator means, for maintaining the second input connection of said comparator means at a first predetermined level below the level of said first input connection during a first signal condition at said input port; and second means, coupled between said input port and said second input connection of said comparator means, for maintaining the second input connection of said comparator means at a second predetermined level above the level at said first input connection during a second signal condition at said input port, whereby the comparator means generates said first signal at its output connection during said first signal condition at said input port and generates said second signal at its output connection during said second signal condition at said input port.

2. A threshold circuit comprising:

a source of input signals;

a comparator means having a first input connection coupled to said source of signals, a second input connection and an output connection;

first level setting means coupled between said source of input signals and said second input connection and being operative to maintain said second input connection at a first predetermined level below the level of a first segment of said input signals; and second level setting means coupled between said source of input signals and said second input connection and being operative to maintain said second input connection at a second predetermined level below the level of a second segment of said input signals, said comparator means being operative to generate a first output signal level when its second input connection is maintained at a level below the level at its first input connection and being operative to generate a second output signal level when its second input connection is maintained at a level above the level at its first input connection

3. A threshold circuit according to claim 2 wherein said source of input signals includes:

label means including a plurality of retroreflective stripes arranged in a coded format and operative to reflect light signals from said stripes; and conversion means coupled between said label means and said comparator means and said first and second level setting means and being operative to convert the light signals from said label into electrical signals.

4. A threshold circuit according to claim 2 wherein said comparator means is a difference amplifier being operative to saturate in a first direction when the input signal at said first input connection is greater than the signal at said second input connection and being operative to saturate in a second direction when the input signal at said second connection is greater than the signal at said first input connection.

5. A threshold circuit according to claim 2 wherein said first level setting means includes:

a rectifier circuit device having an input end coupled to said source of input signals and the output end coupled to the second input connection of said comparator means and being operative to drop the input signals by a predetermined level during a first portion of the first segment of said input signals; and a signal storage device coupled to the common juncture of said rectifier circuit device and the second input connection of said comparator means and being operative to maintain, during a second portion of the first segment of said input signals, the level at said second input connection established by said rectifier circuit device.

6. A threshold circuit according to claim 2 wherein said second level setting means includes:

a rectifier circuit device having the input end coupled to said signal source and the output end coupled to the second input connection of said comparator means and being operative to drop the input signals by a predetermined level during a first portion of the second segment of said input signals; and a signal storage device coupled to the common juncture of said rectifier circuit device and the second input connection of said comparator means and being operative to maintain, during a second portion of the second segment of said input signals, the level at said second input connection established by said rectifier circuit device.

7. A threshold circuit according to claim 5 wherein said second level setting means includes:

a second rectifier circuit device having the input end coupled to said signal source and the output end coupled to the second input connection of said comparator means and being operative to drop the input signals by a predetermined level during a first portion of the second segment of said input signals; and said signal storage device, said signal storage device being operative to maintain, during a second portion of the second segment of said input signals, the level at said second input connection established by said second rectifier circuit device.

8. A threshold circuit according to claim 7 wherein:

said rectifier circuit is a first diode having its anode coupled to said source of signals and its cathode connected to said input connection;

said second rectifier circuit is a second diode having its anode connected to the cathode of said first diode and having its cathode connected to the anode of said first diode; and said storage device is a capacitor coupled to said second input connection of said comparator means.

* * * * *